United States Patent
Torii et al.

(10) Patent No.: US 10,346,698 B2
(45) Date of Patent: *Jul. 9, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventors: Takeshi Torii, Tokyo (JP); Noeru Sato, Tokyo (JP); Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,255

(22) Filed: Feb. 16, 2018

(65) Prior Publication Data

US 2018/0268230 A1 Sep. 20, 2018

(30) Foreign Application Priority Data

Mar. 15, 2017 (JP) ................................ 2017-050345

(51) Int. Cl.
  *G06K 9/00* (2006.01)
  *B60K 35/00* (2006.01)
  *G02B 27/01* (2006.01)

(52) U.S. Cl.
  CPC .......... *G06K 9/00845* (2013.01); *B60K 35/00* (2013.01); *G02B 27/0101* (2013.01);
  (Continued)

(58) Field of Classification Search
  CPC ................ G06K 9/00845; B60K 35/00; B60K 2350/1096; G02B 27/0101; B60R 2300/205
  (Continued)

(56) References Cited

U.S. PATENT DOCUMENTS 7,046,245 B2 * 5/2006 Cerny ................... G06T 15/506
                                                          345/426
7,847,705 B2 * 12/2010 Kido ...................... B60K 35/00
                                                          340/815.4

(Continued)

FOREIGN PATENT DOCUMENTS

JP   03-065448 A   3/1991
JP   11-110697 A   4/1999
(Continued)

OTHER PUBLICATIONS

Y. Maruyama et al., "Introduction of Driver Monitoring System," Oki technical Review, Issue 220, vol. 79, No. 2, Nov. 2012, pp. 16-19, with English translation.

(Continued)

*Primary Examiner* — Daryl C Pope
(74) *Attorney, Agent, or Firm* — McDermott Will & Emery LLP

(57) ABSTRACT

A vehicle display system includes a display device, a determiner, and a display controller. The display device is configured to provide a display on a window of a vehicle. The determiner is configured to determine awakening levels of a driver and an occupant of the vehicle. The display controller is configured to control displaying of the display device, and change the display provided by the display device in accordance with the awakening levels of the driver and the occupant determined by the determiner.

12 Claims, 8 Drawing Sheets

(52) U.S. Cl.
CPC ..... *G06K 9/00281* (2013.01); *G06K 9/00604* (2013.01); *B60K 2350/1096* (2013.01); *B60K 2350/962* (2013.01); *B60R 2300/205* (2013.01)

(58) Field of Classification Search
USPC .................... 340/458, 425.5, 457.1, 3.1, 937
See application file for complete search history.

(56) References Cited

U.S. PATENT DOCUMENTS

| | | | |
|---|---|---|---|
| 8,493,199 B2 * | 7/2013 | Koehler | B62D 15/0285 180/272 |
| 2004/0036769 A1 | 2/2004 | Sadahiro | |

FOREIGN PATENT DOCUMENTS

| JP | 2004-082835 A | 3/2004 |
|---|---|---|
| JP | 2004-318266 A | 11/2004 |
| JP | 2006-135797 A | 5/2006 |
| JP | 2007-331506 A | 12/2007 |
| JP | 2014-092965 A | 5/2014 |
| JP | 2015-186944 A | 10/2015 |

OTHER PUBLICATIONS

Japanese Office Action issued in corresponding Japanese Paent Application No. 2017-050344, dated Aug. 14, 2018, with English Translation.

Non-Final Office Action issued in related U.S. Appl. No. 15/898,257, dated Jul. 6, 2018.

Japanese Office Action issued in corresponding Japanese Patent Application No. 2017-050345, dated Sep. 25, 2018, with English Translation.

* cited by examiner

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050345 filed on Mar. 15, 2017, the entire contents of which are hereby incorporated by reference.

BACKGROUND

The technology relates to a vehicle display system and a method of controlling the vehicle display system.

Japanese Unexamined Patent Application Publication (JP-A) No. 2004-318266 discloses an exemplary vehicle display device that allows for highly safe driving of a vehicle. This vehicle display device optimizes a display output from an existing display device inside the vehicle, in accordance with an awakening level of a driver.

Nowadays, a technique in which a state of a person is recognized on the basis of image information on his/her face is commonly used. As an example, Yuto Maruyama and Atsuko Matsuoka, "Introduction of Driver Monitoring System," Oki Technical Review, issue 220, volume 79, no. 2, November 2012, discloses a technique in which a state of a driver of a vehicle is monitored through facial recognition while the vehicle is running.

SUMMARY

An aspect of the technology provides a vehicle display system that includes: a display device configured to provide a display on a window of a vehicle; a determiner configured to determine awakening levels of a driver and an occupant of the vehicle; and a display controller configured to control displaying of the display device, and change the display provided by the display device in accordance with the awakening levels of the driver and the occupant determined by the determiner.

An aspect of the technology provides a method of controlling a vehicle display system. The method includes: determining awakening levels of a driver and an occupant who ride a vehicle, the vehicle including a window and a display device that provides a display on the window; and changing the display provided by the display device in accordance with the determined awakening levels of the driver and the occupant.

An aspect of the technology provides a vehicle display system that includes: a display device configured to provide a display on a window of a vehicle; and circuitry configured to determine awakening levels of a driver and an occupant of the vehicle, and change, by controlling displaying of the display device, the display provided by the display device in accordance with the determined awakening levels of the driver and the occupant.

DETAILED DESCRIPTION

Figure 1:
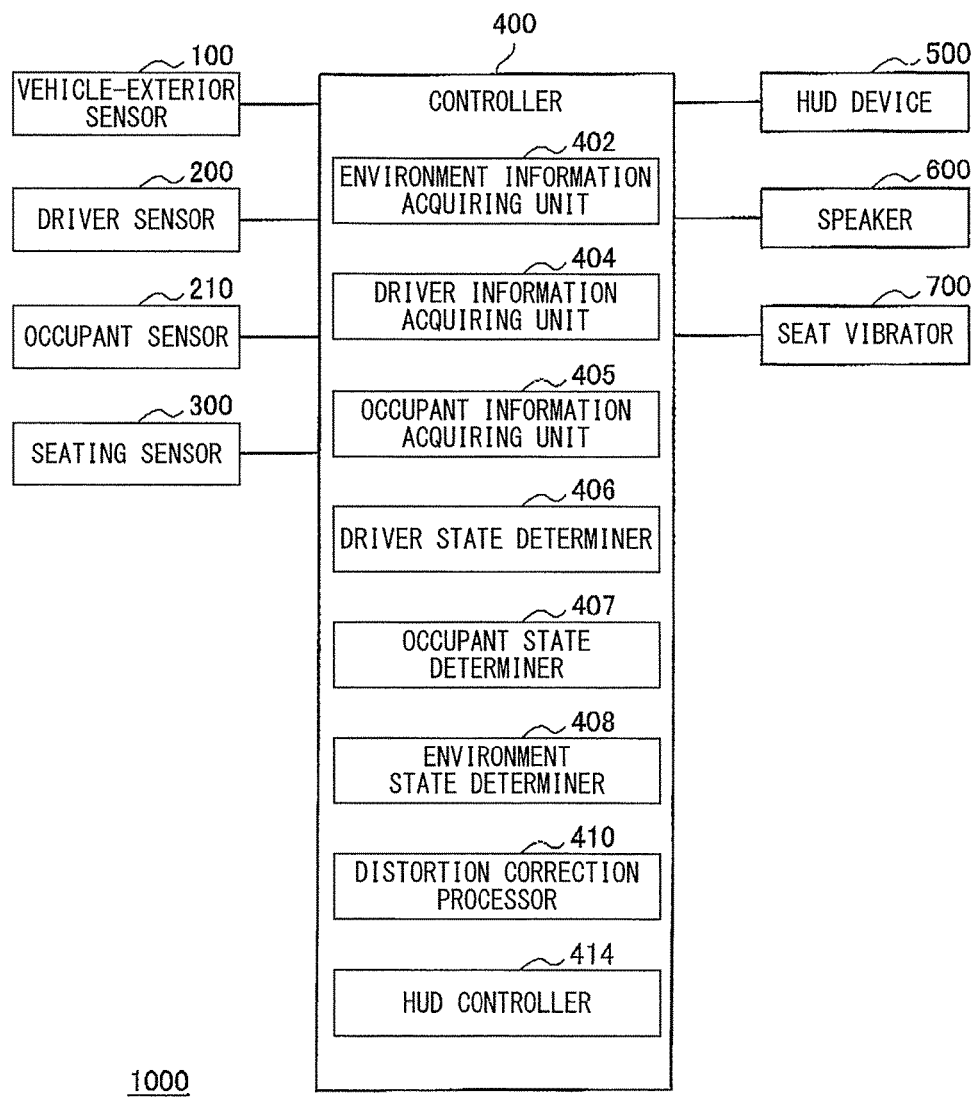
FIG. 1 schematically illustrates an example of a configuration of a vehicle system according to one implementation of the technology.

In a technique disclosed in JP-A No. 2004-318266, a driver of a vehicle may have difficulty reliably recognizing a display when his/her awakening level is lowered.

It is desirable to provide a vehicle display system and a method of controlling the vehicle display system that both make it possible to optimally control displaying of a display device in accordance with awakening levels of a driver and an occupant of a vehicle.

In the following, some non-limiting implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In a technique disclosed in JP-A No. 2004-318266, even if a display is optimized, a driver of a vehicle may have difficulty reliably recognizing this display when his/her awakening level is lowered. When the awakening level is further lowered, the driver may no longer be able to recognize the display and thus drive the vehicle appropriately.

At least one implementation of the technology provides a vehicle display system and a method of controlling the vehicle display system that both make it possible to optimally control displaying of a display device, in accordance with awakening levels of a driver and an occupant.

FIG. 1 schematically illustrates an example of a configuration of a vehicle system 1000 according to one implementation of the technology. The vehicle system 1000 may be basically mounted in a vehicle. The vehicle may be, for example but not limited to, an automobile. Referring to FIG. 1, the vehicle system 1000 may include vehicle-exterior sensors 100, a driver sensor 200, an occupant sensor 210, seating sensors 300, a controller 400, a HUD device 500, speakers 600, and seat vibrators 700.

Each of the vehicle-exterior sensors 100 may be a stereo camera, a monocular camera, millimeter wave radar, an infrared sensor, or any other sensing device. Each vehicle-exterior sensor 100 may measure a parameter such as, but not limited to, a position and speed of an object. Non-limiting examples of the object may include a vehicle and a person around the vehicle. In an example implementation, each vehicle-exterior sensor 100 may be a stereo camera that includes a pair of right and left cameras each having an imaging device such as, but not limited to, a charge-coupled device (CCD) sensor or a complementary metal-oxide semiconductor (CMOS) sensor. Then, the stereo camera may capture an image of an environment outside a vehicle and transmit information on the captured image to the controller 400. In an example implementation, the stereo camera may be a color camera disposed on an upper portion of a windshield of the vehicle and be able to acquire color information.

The HUD device 500 may be a display device that displays information directly in a human visual field. More specifically, the HUD device 500 may display a real image on a window such as, but not limited to, the windshield or a rear window of the vehicle. Although a known HUD device typically displays a virtual image, the HUD device 500 in this implementation may be a display device that displays a real image. The HUD device 500 may display a real image at a viewing angle of about 360 degrees, thereby allowing both persons inside and outside the vehicle to view the image. In an alternative implementation, however, the HUD device 500 may display a virtual image.

Figure 2:
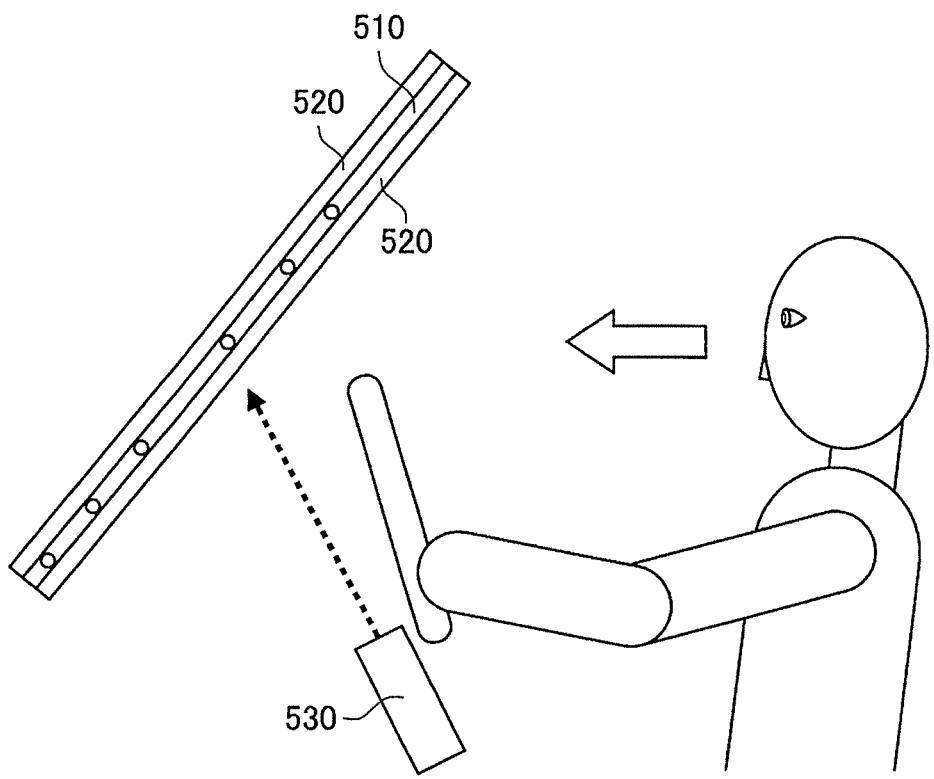
FIG. 2 schematically illustrates an example of a head-up display (HUD) device that includes a self-luminous interlayer film.

In one specific but non-limiting implementation, the HUD device 500 may be a device that includes a self-luminous interlayer film 510, as illustrated in FIG. 2. In such an implementation, the self-luminous interlayer film 510 may be disposed between two sheets of glass 520 in the window of the vehicle such as, but not limited to, the windshield and the rear window. The self-luminous interlayer film 510 may contain a luminescence material. When a portion of the self-luminous interlayer film 510 is irradiated with laser light from a projector 530 mounted in the vehicle, the irradiated portion may emit light, displaying objects, including characters and images. The objects may have visibility at all angles and may be thus viewable not only from the driver seat but also from the other seats as well as any location outside the vehicle. In an alternative implementation, the HUD device 500 may have a configuration in which a self-luminous device is disposed at the window of the vehicle. In such an alternative implementation, the HUD device 500 may have a transparent screen that contains an organic electroluminescence (EL) element, a transmissive liquid crystal device, or any other member that allows for transmissive displaying. In a further alternative implementation, any device other than the HUD device 500 may be used as the display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 500 provides a display on the window, such as the windshield and the rear window, of the vehicle. In one implementation, the HUD device 500 may serve as a "display device". The display device according to any implementation of the technology, however, is not limited to the HUD device 500. The term "HUD device" or "display device" according to any implementation of the technology encompasses any and all display devices provided inside and/or outside a vehicle. In an example implementation, the display device may be provided at any external site of the vehicle other than the window, such as a body of the vehicle. In an example implementation, the display device may be provided at any internal site of the vehicle other than the window, such as the instrument panel and a seat. The display devices disposed inside and outside the vehicle may be provided integrally with or separately from each other.

The driver sensor 200 may be implemented by a camera, a line-of-sight sensor, a motion sensor, or any other sensing device. This driver sensor 200 may measure movements of the driver's arms and head, a direction of his/her line of sight, and any other parameters related to the driver. In an example implementation where the driver sensor 200 is a camera, the driver sensor 200 may acquire the movements of the arms and head, the direction of the line of sight, and any other parameters by subjecting an image captured by the camera to image processing. In another example implementation where the driver sensor 200 is a line-of-sight sensor, the driver sensor 200 may detect the line of sight by using a corneal reflection method or any other similar method. The seating sensors 300 may be provided in the respective seats of the vehicle, and each of the seating sensors 300 may determine whether a person sits on a corresponding seat. The speakers 600 may emit a warning sound toward the inside and outside of the vehicle when the HUD device 500 displays a warning to persons inside and outside of the vehicle. The seat vibrators 700 may be provided in the respective seats inside the vehicle. In addition, the seat vibrators 700 may vibrate the seats to give a warning to the driver and occupants when the HUD device 500 displays a warning inside the vehicle.

The controller 400 may control the displaying of the HUD device 500 on the basis of the information detected by the vehicle-exterior sensors 100, the driver sensor 200, and other sensors. The controller 400 may include an environment information acquiring unit 402, a driver information acquiring unit 404, an occupant information acquiring unit 405, a driver state determiner 406, an occupant state determiner 407, an environment state determiner 408, a distortion correction processor 410, and a HUD controller 414. In one implementation, the driver information acquiring unit 404 and the occupant information acquiring unit 405 may serve as an "image information acquiring unit". In one implementation, the driver state determiner 406 and the occupant state determiner 407 may serve as a "determiner". In one implementation, the HUD controller 414 may serve as a "display controller". Each of the components of the controller 400 may be implemented in hardware or in software. In an example implementation where one component of the controller 400 is implemented in hardware, this component may be circuitry. In another example implementation where one component of the controller 400 is implemented in software, this component may be a program that causes a central processing unit (CPU) or other processor to perform its function.

The environment information acquiring unit 402 may acquire information on a distance to a target, namely, a subject in this case. This information may be called distance information. In an example implementation, the environment information acquiring unit 402 may generate the distance information, on the basis of an amount of shift between corresponding locations in a pair of right and left stereo images and by means of principle of triangulation. The pair of right and left stereo images may be captured by a set of right and left cameras of the stereo camera which constitutes each vehicle-exterior sensor 100 in one implementation. Together with the acquisition of the distance information, the environment information acquiring unit 402 may also acquire information on a location of the subject from the information on the images captured by the set of right and left cameras of the stereo camera which constitutes each vehicle-exterior sensor 100. This information may be called image information. Further, the environment information acquiring unit 402 may perform a known grouping process on the distance information generated by the principle of triangulation. Then, the environment information acquiring unit 402 may obtain data on a three-dimensional object, a lane line, and other objects by comparing the distance information subjected to the grouping process with preset three-dimensional data such as, but not limited to, three-dimensional object data. By performing the processes in this manner, the controller 400 is able to recognize various entities, including a person, another vehicle, a stop sign, a stop line, and an electronic toll collection (ETC) gate.

On the basis of the information on the distance to a factor generated by the principle of triangulation, the environment information acquiring unit 402 may also calculate a variation in the distance to the factor and/or a speed relative to the factor. Non-limiting examples of the factor may include a person and another vehicle. The variation in the distance may be determined by integrating distances to the factor in frame images. The frame images may be acquired at regular time intervals. The relative speed may be determined by dividing the distances acquired at regular time intervals by the unit time.

In the above manner, the environment information acquiring unit 402 may acquire the image information regarding an environment outside the vehicle, from the vehicle-exterior sensors 100. In addition, the environment information acquiring unit 402 may analyze the acquired image information through an image analyzing process. As a result of analyzing the image information, the environment information acquiring unit 402 may acquire environment information regarding the environment outside the vehicle.

Figure 3:
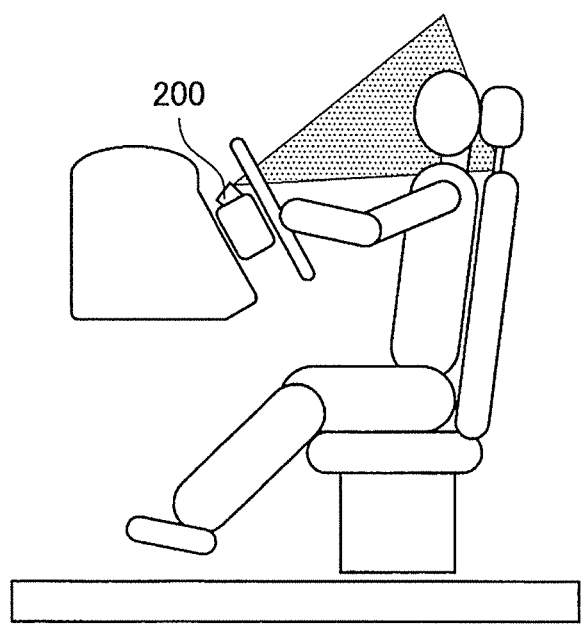
FIG. 3 schematically illustrates an example of a state where a driver sensor captures an image of a driver of a vehicle.

FIG. 3 schematically illustrates an example of a state where the driver sensor 200 captures an image of the driver if the driver sensor 200 is implemented by a camera. As illustrated in FIG. 3, as an example, the driver sensor 200 may be mounted on an upper portion of a steering column.

In an example implementation where the driver sensor 200 is a camera, the image captured by the driver sensor 200 may be supplied to the controller 400. Then, the driver information acquiring unit 404 may acquire a face region of the driver from the received image through an image processing technique such as, but not limited to, an edge and face detection technique. The driver information acquiring unit 404 thereby may acquire an orientation of the face on the basis of the face region. The driver state determiner 406 may determine whether the driver looks aside, on the basis of the face orientation. Moreover, the driver information acquiring unit 404 may obtain information on locations of feature points of predetermined parts of the face, which is called location information. Non-limiting examples of the predetermined parts of the face may include the eyes, the nose, and the mouth. On the basis of this location information, then, the driver state determiner 406 may determine a state of the driver. In an example implementation, the driver state determiner 406 may determine a possibility that the driver looks ahead without due care because of drowsiness or sleeping, for example.

Figure 4:
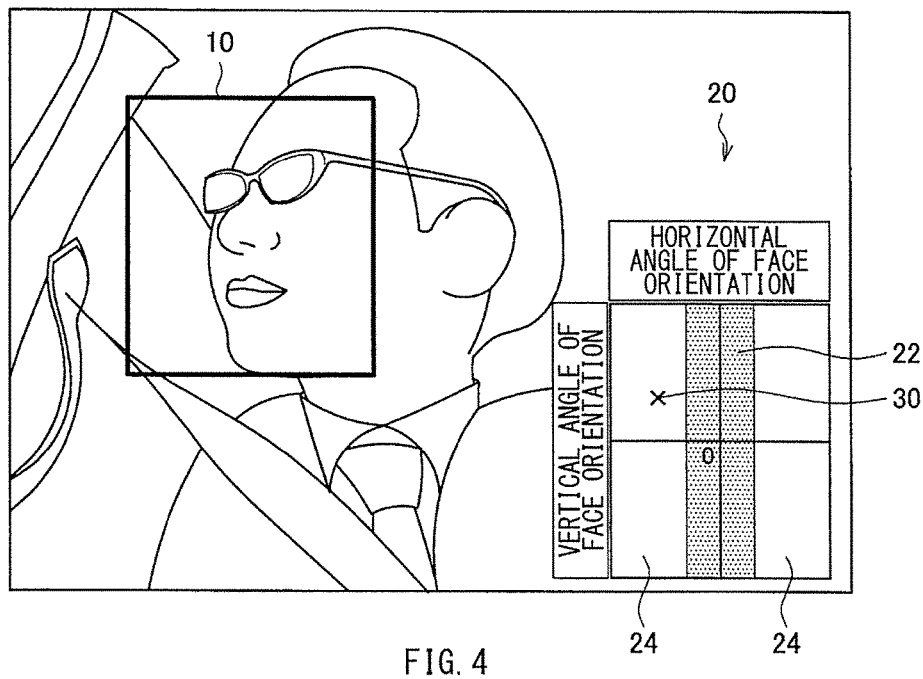
FIG. 4 schematically illustrates an example of a manner in which an angle at which a driver's face is oriented and other face-related factors are calculated on the basis of a face region of the driver.

FIG. 4 schematically illustrates an example in which an angle at which a face is oriented and other face-related factors are calculated on the basis of a face region 10 of the driver which has been detected. On the basis of the face region 10 of the driver which has been acquired from the image information, the driver state determiner 406 may monitor whether the face orientation of the driver falls outside a predetermined region, thereby making it possible to determine a possibility that the driver looks aside. In this case, the face region 10 of the driver may be defined from the location information on the feature points of the parts, including the eyes, the nose, and the mouth, of the face. In order to estimate the face orientation, as an example, the driver state determiner 406 may use, as a reference, a distance between the eyes as seen from the front and then may compare this reference with a distance between the eyes obtained from the image information. It may be determined that, as the distance between the eyes obtained from the image information becomes smaller than the reference, the face is oriented sideways more largely as seen from the front.

FIG. 4 illustrates a detection result 20 at its lower right. In the detection result 20, the vertical axis represents "vertical angle of face orientation", the horizontal axis represents "horizontal angle of face orientation", and an X-mark 30 denotes "detected angles of face orientation". In the detection result 20, a shaded, rectangular area at the center may be a front region 22. If detected angles of the face orientation fall within the front region 22, the driver state determiner 406 may determine that the driver looks ahead. If the detected angles are shifted from within the front region 22 to within one of right and left side regions 24, as indicated by the X-mark 30, the driver state determiner 406 may determine that there is a possibility that the driver looks aside. Thresholds used to differentiate the front region 22 and right and left side regions 24 from one another may be varied as appropriate. In one example implementation, the thresholds may be set to about −20 degrees and +20 degrees in the horizontal direction. In one example implementation, whether the driver looks aside may be determined in the following manner. First, a ratio of a period over which the angles of the face orientation stay within one of the right and left side regions 24 to a reference period may be calculated. Then, if the calculated ratio exceeds a predetermined threshold, it may be determined that the driver looks aside. In an alternative example implementation, if the angles of the face orientation continue to fall outside a predetermined range over a predetermined period or if the driver sensor 200 successively fails to detect the driver's face over a predetermined period, the driver state determiner 406 may determine that the driver looks aside.

Figure 5:
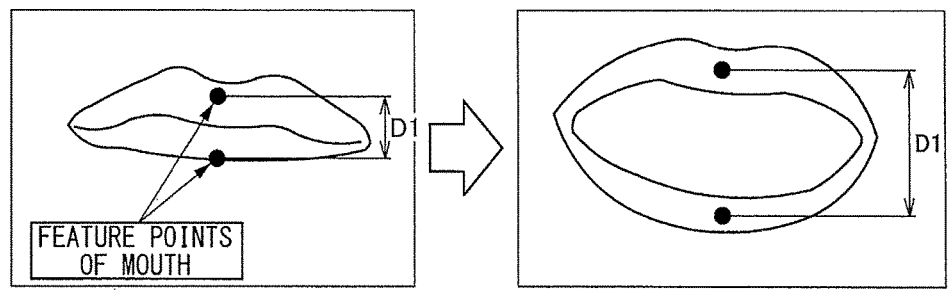
FIG. 5 schematically illustrates a mouth opening detection for use in determining whether the driver opens his/her mouth.

FIG. 5 schematically illustrates a mouth opening detection for use in determining whether the driver opens his/her mouth. As illustrated in FIG. 5, whether the driver opens the mouth may be determined on the basis of a distance D1 between the feature points of the upper and lower parts of the mouth. If the distance D1 exceeds a predetermined value, for example, as illustrated in the right part of FIG. 5 which illustrates a mouth-opened state, it may be determined there is possibility that the driver opens the mouth and yawns. In one example implementation, if a state where the driver continues to open the mouth over a predetermined period is detected a preset number of times, it may be determined that there is an increasing possibility that the driver sleeps.

Figure 6:
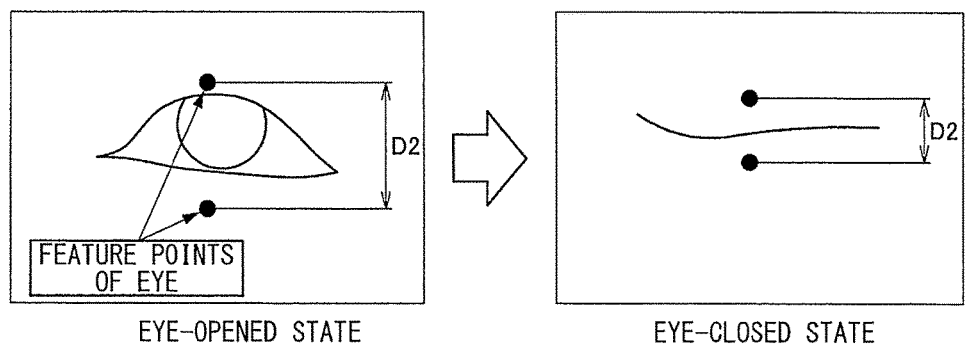
FIG. 6 schematically illustrates an example of a manner in which whether the driver closes his/her eyes is determined.

FIG. 6 schematically illustrates an example of a manner in which whether the driver closes his/her eyes is determined. As illustrated in FIG. 6, it may be detected whether the driver closes the eyes, from a distance D2 between feature points of upper and lower parts of any of the eyes. If the distance D2 is equal to or less than a predetermined value, for example, as illustrated in the right part of FIG. 6 which illustrates an eye-closed state, it may be determined that there is a possibility that the driver sleeps. In one example implementation, whether the driver sleeps may be determined in the following manner. First, an eye closure ratio, which is a ratio of a period over which the driver continues to close the eyes to a reference period may be calculated. Then, if the calculated eye closure ratio exceeds a predetermined threshold, it may be determined that the driver sleeps. In another example implementation, if a state where driver closes the eyes is detected a predetermined number of times within a preset period, it may be determined that there is an increasing possibility that the driver sleeps. In further another example implementation, blinks may be detected through image processing. Then, on the basis of the frequency of the blinks, whether the driver sleeps may be determined. These determinations, as illustrated in FIGS. 5 and 6, may be made by the driver state determiner 406.

The environment state determiner 408 in the controller 400 may determine information on an environment outside the vehicle, on the basis of the environment information acquired by the environment information acquiring unit 402. The environment state determiner 408 may set a person outside the vehicle to a target person and determine a state of this target person.

In one implementation, the occupant sensor 210 may be mounted in front of an occupant sitting on the front passenger seat. In one example implementation, the occupant sensor 210 may be mounted on the dashboard in front of the occupant on the front passenger seat. In an alternative example implantation, a plurality of occupant sensors 210 may be mounted in front of respective occupants sitting on all the passenger seats. The occupant sensor 210 may capture an image of the occupant in a manner similar to the way in which the driver sensor 200 captures the image of the driver. The occupant information acquiring unit 405 may acquire a face region of the occupant from the image captured by the occupant sensor 210, through an image processing technique such as, but not limited to, an edge and face detection technique. The occupant information acquiring unit 405 thereby may acquire a face orientation on the basis of the face region. Then, the occupant state determiner 407 may determine whether the occupant looks aside, on the basis of the angles of the face orientation. Moreover, the occupant information acquiring unit 405 may detect a state of the occupant from location information on feature points of predetermined parts of the face. Non-limiting examples of the predetermined parts of the face may include the eyes, the nose, and the mouth. On the basis of the detected occupant state, then, the occupant state determiner 407 may determine a possibility that the occupant looks ahead without due care because of drowsiness or sleeping, for example.

The occupant sensor 210 and the driver sensor 200 may be implemented by a single unit. In such an implementation, the occupant information acquiring unit 405 and the driver information acquiring unit 404 may be implemented by a single unit. Likewise, the occupant state determiner 407 and the driver state determiner 406 may be implemented by a single unit.

The HUD controller 414 may control the displaying of the HUD device 500. More specifically, the HUD controller 414 may control the displaying of the HUD device 500, on the basis of the determination results of the driver state determiner 406, the occupant state determiner 407, and any other determiners.

In one implementation, when the vehicle-exterior sensors 100 detect the presence of a person or another vehicle around the vehicle, the HUD device 500 may display a warning to the driver. For example, if a person, vehicle, or other object is present in front of the vehicle running ahead, the HUD device 500 may display a warning to the driver, thereby encouraging the driver to pay more attention to his/her forward area. In addition, the HUD device 500 may also display a warning to a person or another vehicle outside the vehicle, because this warning display may be viewable from the outside of the vehicle. In one implementation, the driver information acquiring unit 404 may acquire a state of the driver from the driver sensor 200. Then, the driver state determiner 406 may determine whether the driver is in a normal state. On the basis of this determination result, the HUD controller 414 may control the displaying of the HUD device 500. In one implementation, the occupant information acquiring unit 405 may acquire the state of the occupant from the occupant sensor 210. Then, the occupant state determiner 407 may determine whether the occupant is in a normal state. On the basis of this determination result, the HUD controller 414 may control the displaying of the HUD device 500.

To determine whether the driver and the occupant are in a normal state, the driver state determiner 406 and the occupant state determiner 407 may determine awakening levels of the driver and the occupant, on the basis of the results of the determinations whether the driver and the occupant look aside and whether the driver and the occupant look ahead without due care because of drowsiness or sleeping, for example. In accordance with the awakening levels of the driver and the occupant, the HUD controller 414 may optimally control the displaying of the HUD device 500. In one example implementation, the determination of each awakening level may be made on the basis of a drowsiness level or a health problem associated with a disease.

In one specific but non-limiting implementation, the HUD controller 414 may switch a plurality of displays in accordance with the awakening levels of the driver and the occupant, details of which will be described later. The HUD device 500 thereby may provide a single display toward the driver or both the driver and the occupant or may provide two displays toward the driver and the occupant, in accordance with the awakening levels of the driver and the occupant. In this way, it is possible to ensure safety even when an awakening level of the driver is lowered, without causing the occupant to be annoyed by the display.

TABLE 1

| DRIVER/OCCUPANT | AWAKE | AWAKENING LEVEL IS LOWERED | NOT AWAKE |
|---|---|---|---|
| AWAKE | DISPLAY TOWARD DRIVER | DISPLAY TOWARD DRIVER | DISPLAY TOWARD DRIVER |
| AWAKENING LEVEL IS LOWERED | DISPLAY IN MIDSECTION BETWEEN DRIVER AND OCCUPANT | DISPLAY TOWARD DRIVER | DISPLAY TOWARD DRIVER |
| NOT AWAKE | DISPLAYS TOWARD DRIVER AND OCCUPANT | DISPLAYS TOWARD DRIVER AND OCCUPANT | DISPLAYS TOWARD DRIVER AND OCCUPANT |

To determine whether the driver looks aside and whether there is a possibility that the driver looks ahead without due care because of drowsiness or sleeping, for example, the driver state determiner 406 may classify the awakening level of the driver into three states as illustrated in Table 1 by using thresholds. Likewise, to determine whether the occupant looks aside or whether there is a possibility that the occupant looks ahead without due care because of drowsiness or sleeping, for example, the occupant state determiner 407 may classify the awakening level of the occupant into three states as illustrated in Table 1 by using thresholds. In Table 1, the leftmost column represents the awakening level of the driver. The driver state determiner 406 may use two thresholds for the determination, classifying the awakening level into the three states, i.e., a state in which the driver is awake (denoted as "AWAKE"), a state in which the awakening level of the driver is lowered (denoted as "AWAKENING LEVEL IS LOWERED"), and a state in which the driver is not awake (denoted as "NOT AWAKE"). The state in which the driver is not awake may alternatively be defined as a state in which the awakening level of the driver is greatly lowered. In Table 1, the uppermost row represents the awakening level of the occupant. The occupant state determiner 407 may use two thresholds for the determination, classifying the awakening level into the three states, i.e., a state in which the occupant is awake (denoted as "AWAKE"), a state in which the awakening level of the occupant is lowered (denoted as "AWAKENING LEVEL IS LOWERED"), and a state in which the occupant is not awake (denoted as "NOT AWAKE"). The state in which the occupant is not awake may alternatively be defined as a state in which the awakening level of the occupant is greatly lowered.

On the basis of the above awakening levels in Table 1, the HUD controller 414 may switch the plurality of displays. In one example implementation, a display may be provided on the windshield in front of the driver or in the midsection between the driver and the front passenger seat, or two displays may be provided on the window in front of the driver and front passenger seats. By switching these displays, any one of the "DISPLAY TOWARD DRIVER", the "DISPLAY IN MIDSECTION BETWEEN DRIVER AND OCCUPANT", and "DISPLAYS TOWARD DRIVER AND OCCUPANT" in Table 1 may be selected.

Figure 7:
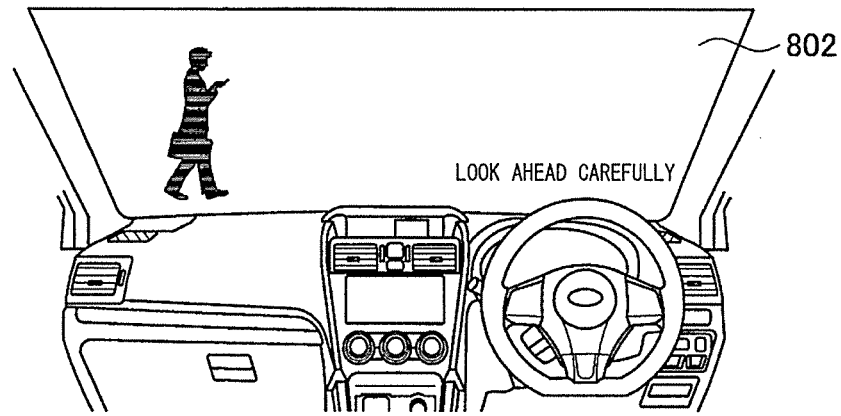
FIG. 7 schematically illustrates an example of a display toward the driver.
Figure 8:
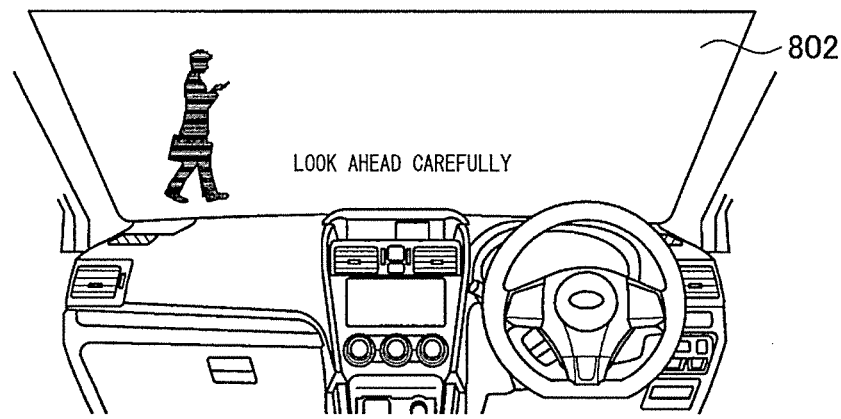
FIG. 8 schematically illustrates an example of a display positioned where both the driver and an occupant are able to view easily.
Figure 9:
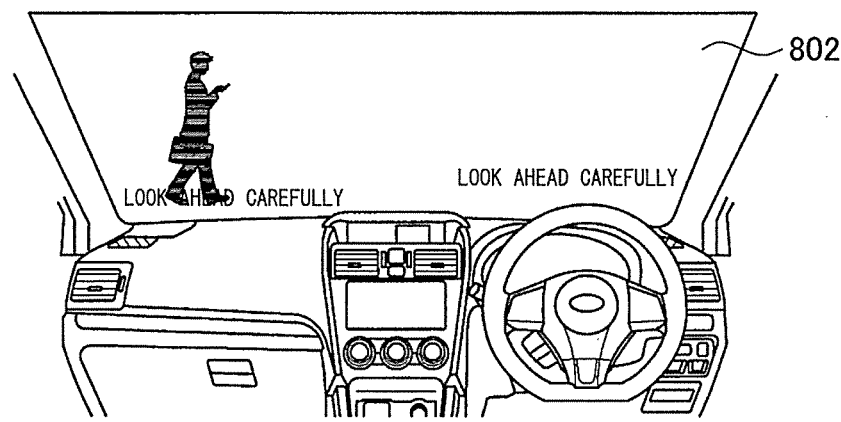
FIG. 9 schematically illustrates an example of displays toward the driver and the occupant.

FIGS. 7 to 9 each schematically illustrate an example of a display provided in accordance with the awakening levels of the driver and the occupant. FIG. 7 schematically illustrates an example of a display toward the driver. As in an example implementation illustrated in FIG. 7, the HUD device 500 may display a warning message saying "LOOK AHEAD CAREFULLY" on a windshield 802 in front of the driver. FIG. 8 schematically illustrates an example of a display positioned where both the driver and the occupant are able to view easily. As in an example implementation illustrated in FIG. 8, the HUD device 500 may display the warning message on the windshield 802 in the midsection between the driver and occupant. FIG. 9 schematically illustrates an example of displays toward a driver and an occupant. As in an example implementation illustrated in FIG. 9, the HUD device 500 may display warning messages on the windshield 802 in front of the driver and the occupant.

As is seen from Table 1, when the awakening level of the driver is high enough for the driver to be able to drive the vehicle carefully, the HUD device 500 may provide a display toward the driver. In this case, when the awakening level of the occupant is lowered, the HUD device 500 may avoid forcedly increasing the awakening level of the occupant, in other words, may avoid forcedly wakening the occupant in a sleepy state, and may provide a display toward the driver. When the awakening level of the driver is greatly lowered due to unconsciousness, for example, the HUD device 500 may provide displays toward the driver and the occupant, encouraging the occupant to assist the driver's operation or prepare to ensure safety.

The face orientation of the target person or a direction of his/her line of sight may be taken into consideration instead of simply displaying the warning message at a predetermined front location. When the warning message is displayed on the windshield 802, this warning message is usually distorted in accordance with a curvature of the windshield 802. Therefore, in an example implementation, the distortion of the warning message or the distortions of the warning messages may be corrected in accordance with the awakening levels. In this way, the display may be adjusted and tailored for an either one of the driver and the front passenger seat, or the displays may be adjusted and tailored for both the driver and the front passenger seat.

Figure 10:
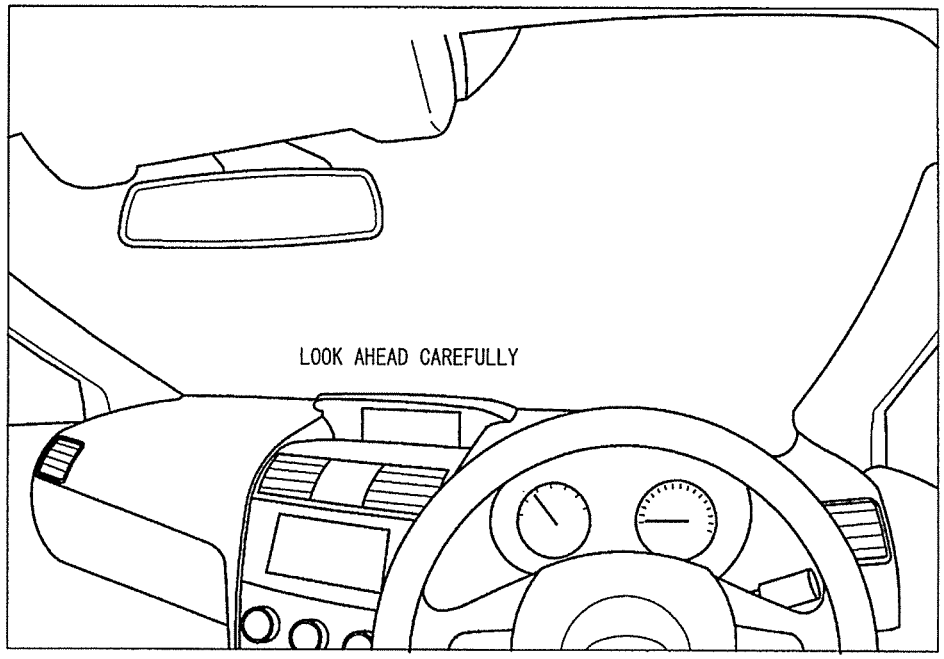
FIG. 10 schematically illustrates an example of a manner in which distortion correction is made for the driver.
Figure 11:
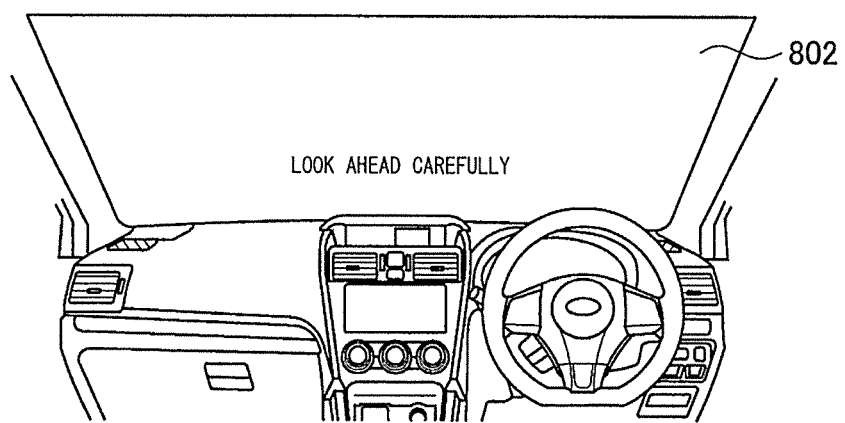
FIG. 11 schematically illustrates an example of a manner in which distortion correction is made for both the driver and the occupant.
Figure 12:
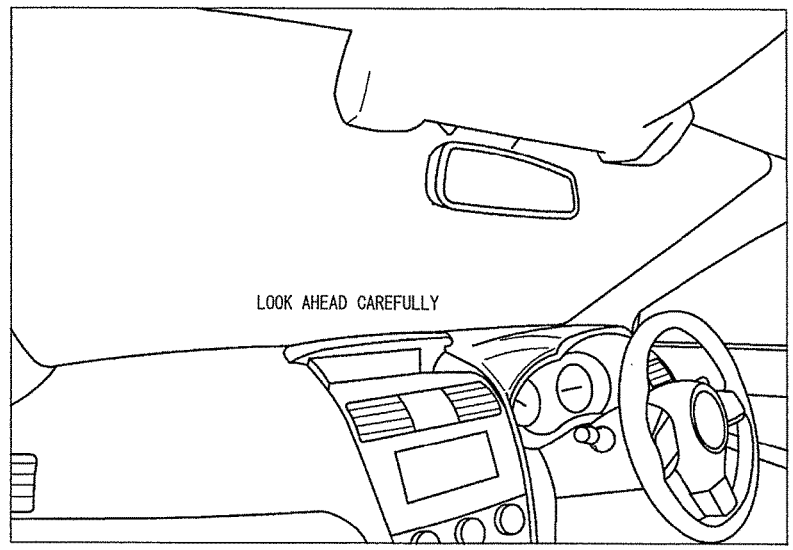
FIG. 12 schematically illustrates an example of a manner in which distortion correction is made for the occupant.

FIGS. 10 to 12 each schematically illustrate an example of a manner in which the distortion of the warning message is corrected in accordance with the awakening levels of the driver and the occupant. The distortion correction may be made by the distortion correction processor 410. FIG. 10 schematically illustrates an example of a manner in which the distortion correction is made for the driver. As in an example implementation illustrated in FIG. 10, the message may be enlarged vertically toward the left, i.e., the height of the right side of the display may be set to be smaller than the height of the left side of the display. When the driver views this message, all the letters in the message may be perceived as having the same height. FIG. 11 schematically illustrates an example of a manner in which distortion correction is made for both a driver and an occupant. As in an example implementation illustrated in FIG. 11, the message may have the uniform height, i.e., the right and the left sides of the display may have the same height as each other. FIG. 12 schematically illustrates an example of a manner in which distortion correction is made for the occupant. As in an example implementation illustrated in FIG. 12, the message may be enlarged vertically toward the right, i.e., the height of the left side of the display may be set to be smaller than the height of the right side of the display. When the occupant views this message, all the letters in the message may be perceived as having the same height.

Figure 14:
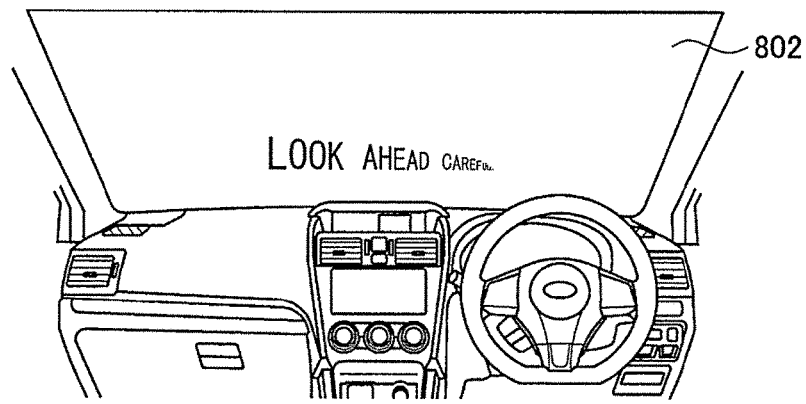
FIG. 14 schematically illustrates an example of a display with its shape altered for the driver.
Figure 15:
FIG. 15 schematically illustrates an example of a display with its shape altered for the occupant.

FIGS. 14 and 15 each schematically illustrate an example of a display whose shape is altered in accordance with the awakening levels of the driver and the occupant. FIG. 14 schematically illustrates an example of a display with its shape altered for the driver. As in an example implementation illustrated in FIG. 14, letters in the display may be enlarged vertically toward the left, i.e., sizes of the letters on the right side of the display may be set to be smaller than sizes of the letters on the left side of the display. When the driver views this display, the display may be perceived to be oriented toward the driver. FIG. 15 schematically illustrates an example of a display with its shape altered for the occupant. As in an example implementation illustrated in FIG. 15, letters in a display may be enlarged vertically toward the right, i.e., sizes of the letters on the left side of the display may be set to be smaller than sizes of the letters on the right side of the display. When the occupant views this display, the display may be perceived to be oriented toward the occupant.

Figure 13:
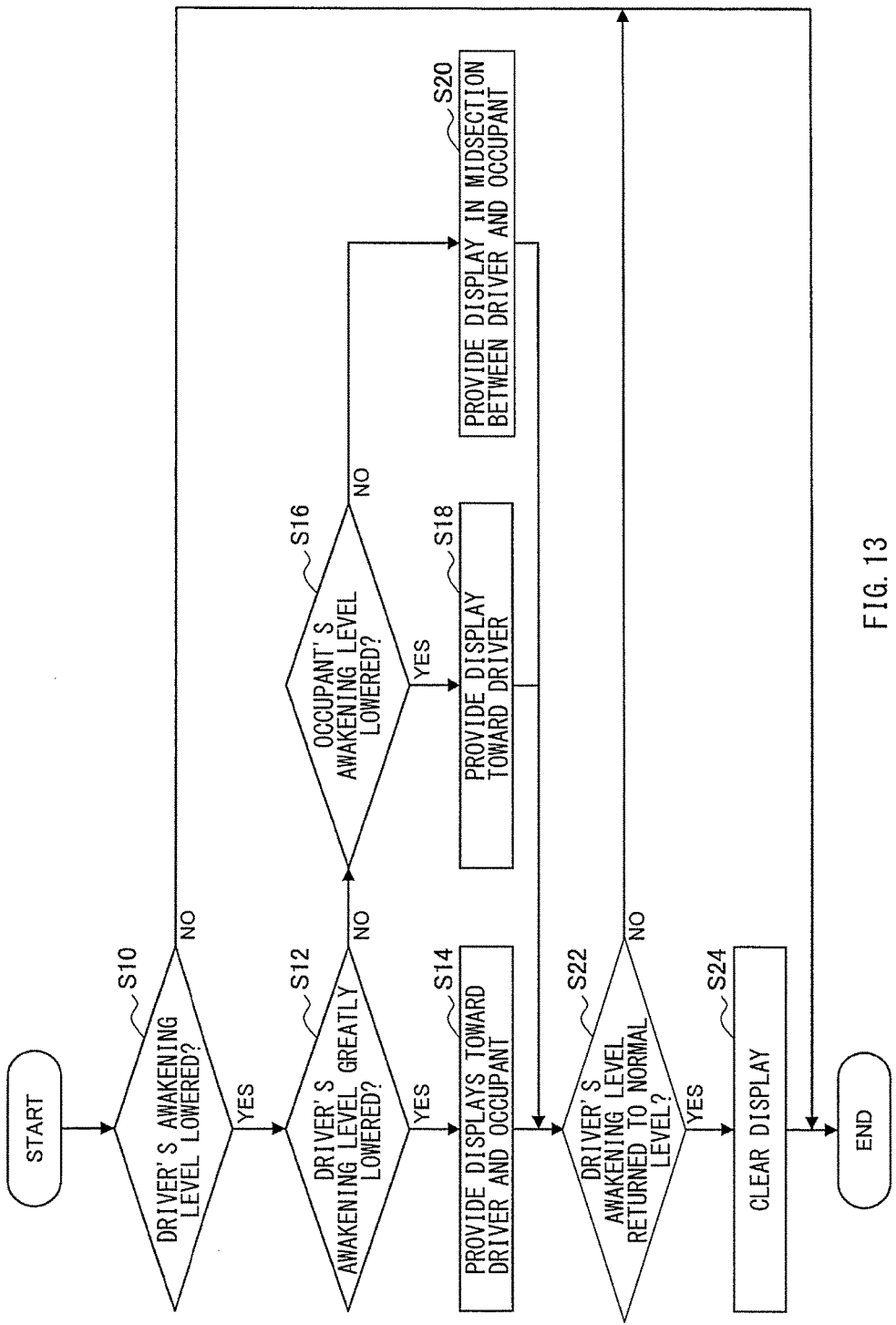
FIG. 13 is a flowchart of an example of a process performed by the vehicle system according to one implementation.

Next, a description is given of an example of a process performed by the vehicle system 1000 according to one implementation, with reference to a flowchart of FIG. 13. The process of FIG. 13 is performed by the components of the controller 400 and is repeated during predetermined control periods. In step S10, the driver information acquiring unit 404 may acquire driver information, and the driver state determiner 406 may determine whether the awakening level of the driver is lowered. When the driver state determiner 406 determines that the awakening level of the driver is lowered (S10: YES), the flow may proceed to step S12. In step S12, the driver state determiner 406 may determine whether the awakening level of the driver is greatly lowered. When the driver state determiner 406 determines that the awakening level of the driver is greatly lowered (S12: YES), the flow may proceed to step S14. This situation may correspond to the state in which the driver is not awake (denoted as "NOT AWAKE") in Table 1. In step S14, therefore, the HUD controller 414 may control the displaying of the HUD device 500 to provide displays toward the driver and the occupant, as illustrated in FIG. 9. Providing the displays in this manner makes it possible to encourage the occupant to assist a driver's operation or prepare to ensure safety. When the driver state determiner 406 determines that the awakening level of the driver is not lowered in step S10 (S10: NO), the HUD controller 414 may control the displaying of the HUD device 500 to provide a display toward the driver, as illustrated in FIG. 7.

When the driver state determiner 406 determines that the awakening level of the driver is not greatly lowered at step S12 (S12: NO), the flow may proceed to step S16. In step S16, the occupant information acquiring unit 405 may acquire occupant information, and the occupant state determiner 407 may determine whether the awakening level of the occupant is lowered. When the occupant state determiner 407 determines that the awakening level of the occupant is lowered (S16: YES), the flow may proceed to step S18. This situation may correspond to the state in which the awakening level of the driver is lowered (denoted as "AWAKENING LEVEL IS LOWERED") and either one of the state in which the awakening level of the occupant is lowered (denoted as "AWAKENING LEVEL IS LOWERED") and the state in which the occupant is not awake (denoted as "NOT AWAKE") in Table 1. In step S18, therefore, the HUD controller 414 may control the displaying of the HUD device 500 to provide a display toward the driver, as illustrated in FIG. 7. In this case, the HUD device 500 may provide the display toward the driver in order to awaken the driver, because the awakening level of the occupant may be lowered. Optionally, the speakers 600 may emit the warning sound and the seat vibrators 700 may vibrate the seats.

When the occupant state determiner 407 determines that the awakening level of the occupant is not lowered at step S16 (S16: NO), the flow may proceed to step S20. This situation may correspond to the state in which the awakening level of the driver is lowered (denoted as "AWAKENING LEVEL IS LOWERED") and the state in which the occupant is awake (denoted as "AWAKE") in Table 1. In step S20, therefore, the HUD controller 414 may control the displaying of the HUD device 500 to provide a display in the midsection between the driver and occupant, as illustrated in FIG. 8. Providing the display in this manner makes it possible to awake both the driver and occupant. Optionally, the speakers 600 may emit the warning sound and the seat vibrators 700 may vibrate the seats.

After step S14, S18, or S20 has been performed, the flow may proceed to step S22. In step S22, the driver state determiner 406 may determine whether the awakening level of the driver is returned to a normal level. When the driver state determiner 406 determines that the awakening level of the driver is returned to the normal level (S22: YES), the flow may proceed to step S24. In step S24, the HUD device 500 may clear the display, and the process in the current control period may be concluded (END). When the driver state determiner 406 determines that the awakening level of the driver is not returned to the normal level (S22: NO), the HUD device 500 may maintain the display, and the process in the current control period may be concluded (END).

According to one implementation, as described above, the vehicle system 1000 is able to optimally control the displaying of the display device in accordance with the awakening levels of the driver and the occupant.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
   a display device configured to provide an image on a window of a vehicle;

one or more sensors configured to detect a state of a driver of the vehicle and a state of an occupant of the vehicle;

a controller configured to:
- determine an awakening level of the driver of the vehicle based on the detected state of the driver;
- determine an awakening level of the occupant of the vehicle based on the detected state of the occupant; and
- control the display device to provide the image on the window of the vehicle based on 1) the determined awakening level of the driver and 2) the determined awakening level of the occupant,
- wherein, when 1) the awakening level of the driver indicates that the driver's awakening level is lowered and 2) the awakening level of the occupant indicates that the occupant is awake, the controller controls the display device to provide, on the window, the display in a midsection between the driver and the occupant.

2. The vehicle display system according to claim 1, wherein, when the awakening level of the driver indicates that the driver is awake, the controller controls the display device to provide, on the window, the image toward the driver.

3. The vehicle display system according to claim 1, wherein, when 1) the awakening of the driver indicates that the driver's awakening level is lowered and 2) the awakening level of the occupant indicates the occupant's awakening level is lowered, the controller controls the display device to provide, on the window, the toward the driver.

4. The vehicle display system according to claim 1, wherein to provide the image toward the driver, the controller controls the display device to provide, on the window, the image in front of the driver.

5. The vehicle display system according to claim 3, wherein to provide the image toward the driver, the controller controls the display device to provide the image, on the window, in front of the driver.

6. The vehicle display system according to claim 1, further comprising a distortion correction processor configured to correct distortion of the image displayed by the display device, wherein to provide the image toward the driver,
- the controller controls the display device to provide, on the window, the image in a midsection between the driver and the occupant; and
- the distortion correction processor corrects the distortion of the image for the driver.

7. The vehicle display system according to claim 3, further comprising a distortion correction processor configured to correct distortion of the image displayed by the display device, wherein to provide the image toward the driver,
- the controller controls the display device to provide, on the window, the image in a midsection between the driver and the occupant; and
- the distortion correction processor correcting the distortion of the image for the driver.

8. The vehicle display system according to claim 1, further comprising a distortion correction processor configured to correct distortion of the image displayed by the display device, wherein to provide the image in the midsection between the driver and the occupant, the distortion correction processor corrects the distortion of the image for the occupant.

9. The vehicle display system according to claim 1, wherein, when the awakening level of the driver indicates that the driver is not awake, the controller controls the display device to provide, on the window, the image in front of the driver while providing the image in front of the occupant.

10. The vehicle display system according to claim 1, wherein the one or more sensors comprise a camera configured to capture images of the states of the driver and the occupant, and
wherein the controller:
- acquires information on the images of the driver and the occupant from the camera; and
- determines the awakening levels of the driver and the occupant based on the information on the images.

11. A method of controlling a vehicle display system, the method comprising:
- determining awakening levels of a driver and an occupant of a vehicle based on state of the driver and the occupant detected by one or more sensors, the vehicle including a window and a display device configured to provide an image on the window;
- detecting a change in at least one of the awakening levels of the driver and the occupant; and
- changing a display orientation of the image displayed on the window from a first orientation to a second orientation based on the detected change in the at least one of the awakening levels of the driver and the occupant.

12. A vehicle display system comprising:
a display device configured to provide an image on a window of a vehicle; and
circuitry configured to:
- determine awakening levels of a driver and an occupant of the vehicle based on state of the driver and the occupant detected by one or more sensors;
- detect a change in at least one of the awakening levels of the driver and the occupant; and
- change, by controlling the display device, a display location of the image displayed on the window from a first location to a second location based on the detected change in the at least one of awakening levels of the driver and the occupant.

* * * * *